United States Patent [19]
Newman

[11] Patent Number: 6,003,805
[45] Date of Patent: Dec. 21, 1999

[54] ADJUSTABLE STATOR WINDING HEAD AND METHOD FOR ADJUSTING THE SAME

[75] Inventor: Lawrence E. Newman, Tipp City, Ohio

[73] Assignee: Globe Products Inc., Huber Heights, Ohio

[21] Appl. No.: 08/855,355

[22] Filed: May 13, 1997

[51] Int. Cl.$^6$ ............................................. H02K 15/085
[52] U.S. Cl. ........................... 242/432.5; 242/432.6; 29/596
[58] Field of Search ............... 242/432.5, 432.6, 242/432.2, 432.3, 432.4, 439.5; 29/605, 596

[56] References Cited

U.S. PATENT DOCUMENTS

| | | |
|---|---|---|
| 3,251,559 | 5/1966 | Moore . |
| 3,334,825 | 8/1967 | Friedrich .......................... 242/432.6 X |
| 3,411,725 | 11/1968 | Biddison . |
| 3,471,926 | 10/1969 | Sims ........................................ 29/596 |
| 3,524,600 | 8/1970 | Peters .................................... 242/432.5 |
| 4,158,314 | 6/1979 | Finegold ..................................... 74/23 |
| 4,612,702 | 9/1986 | Wheeler ..................................... 29/596 |
| 4,762,283 | 8/1988 | Sabatino . |
| 4,858,835 | 8/1989 | Luciani et al. . |
| 4,991,782 | 2/1991 | Luciani ................................. 242/432.4 |
| 5,273,223 | 12/1993 | Tsugawa . |
| 5,560,554 | 10/1996 | Miyawaki et al. ................... 242/432.4 |
| 5,596,796 | 1/1997 | Ruoss ............................... 242/432.6 X |

FOREIGN PATENT DOCUMENTS 2068787  8/1981  United Kingdom .

*Primary Examiner*—Donald P. Walsh
*Assistant Examiner*—Emmanuel M. Marcelo
*Attorney, Agent, or Firm*—Roger S. Dybvig

[57] ABSTRACT

Depending on the diameter of the wire wound into coils on a stator core, it is desirable to adjust the distance that the wire exit nozzle of a stator needle tip is spaced from the longitudinal axis of the winding head. An adjustable winding head comprising a needle head and one or more needle tips pivotally mounted on the needle head. Pivotal movement of the needle tips relative to the needle head changes the distance that the wire exit nozzles thereof are spaced from the longitudinal axis of the needle head. Adjustment is carried out preferably while the winding spindle is stationary, requires only simple tools, and does not require removal of the needle tips from the needle head.

16 Claims, 3 Drawing Sheets

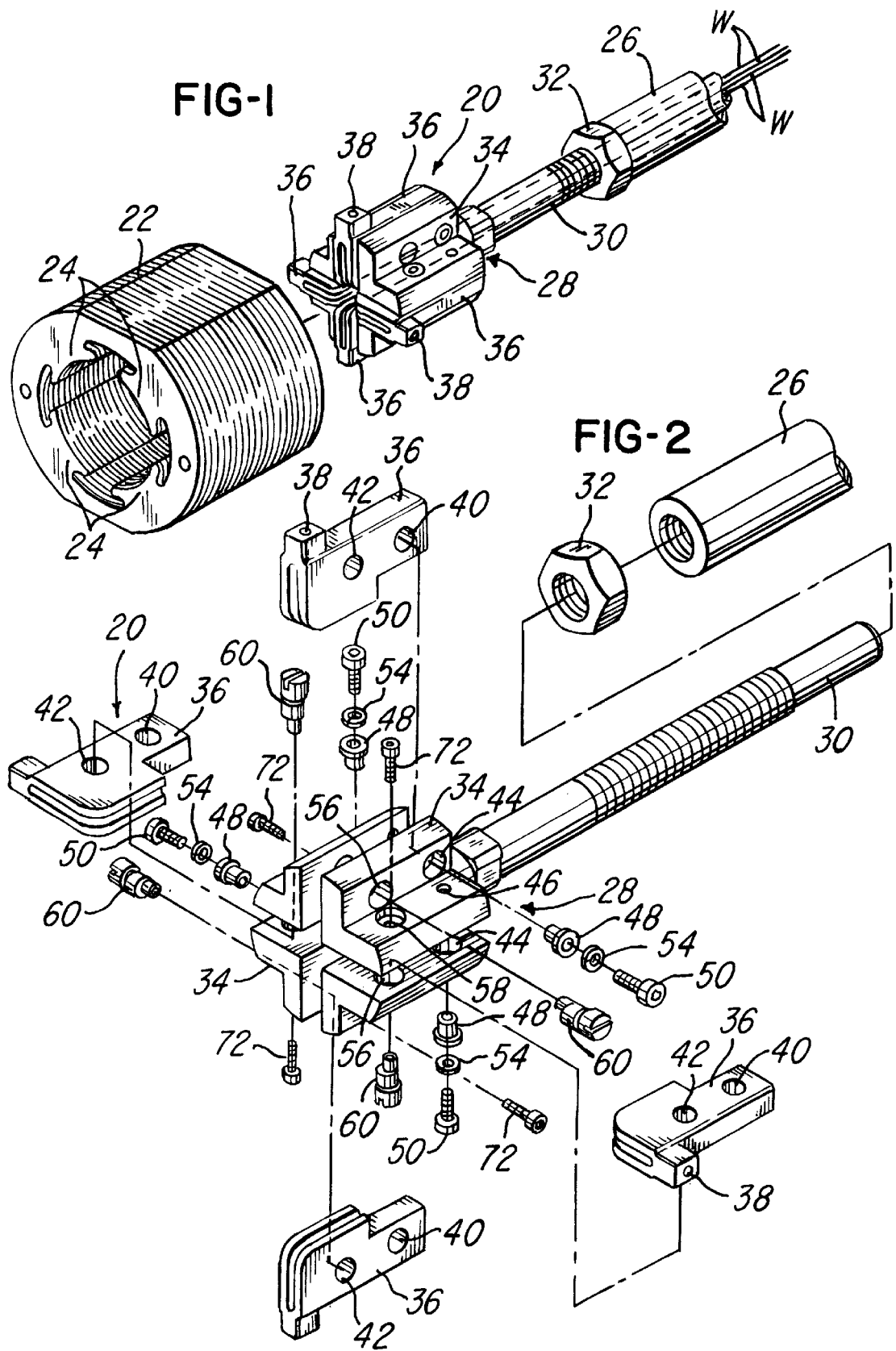

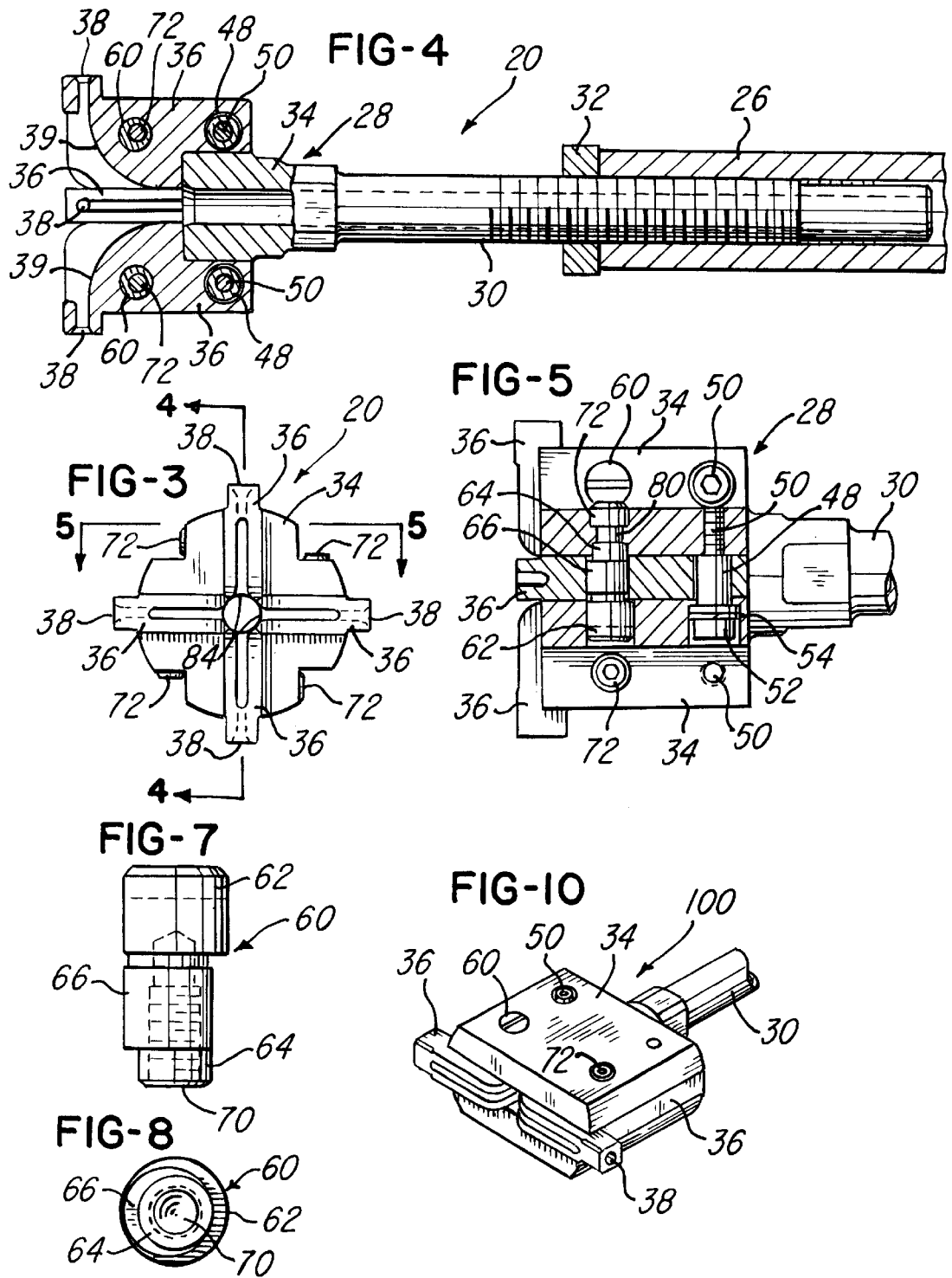

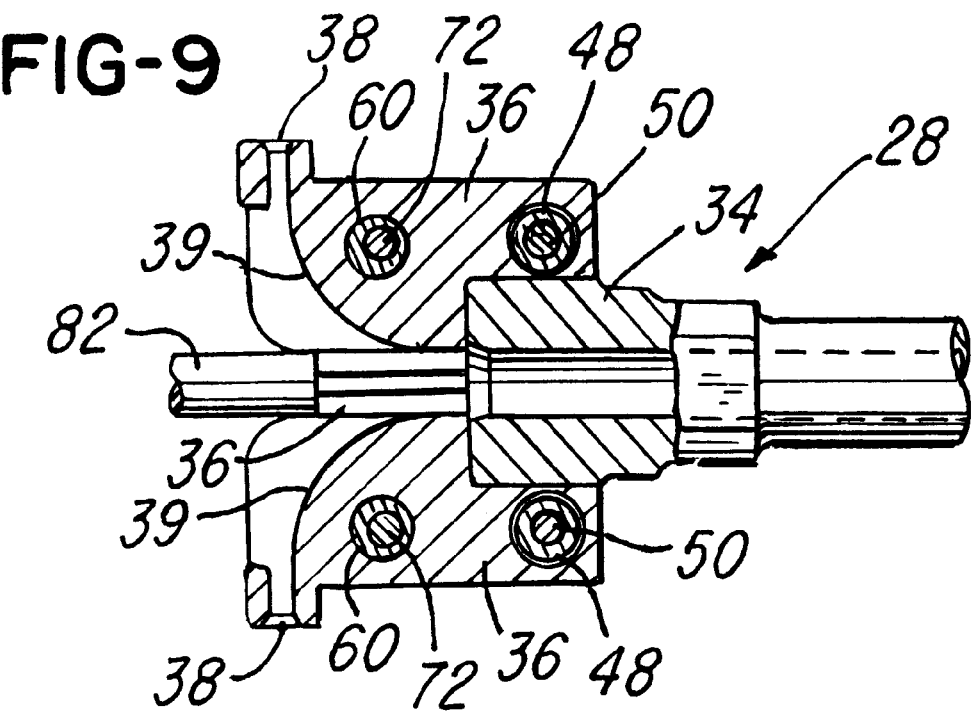
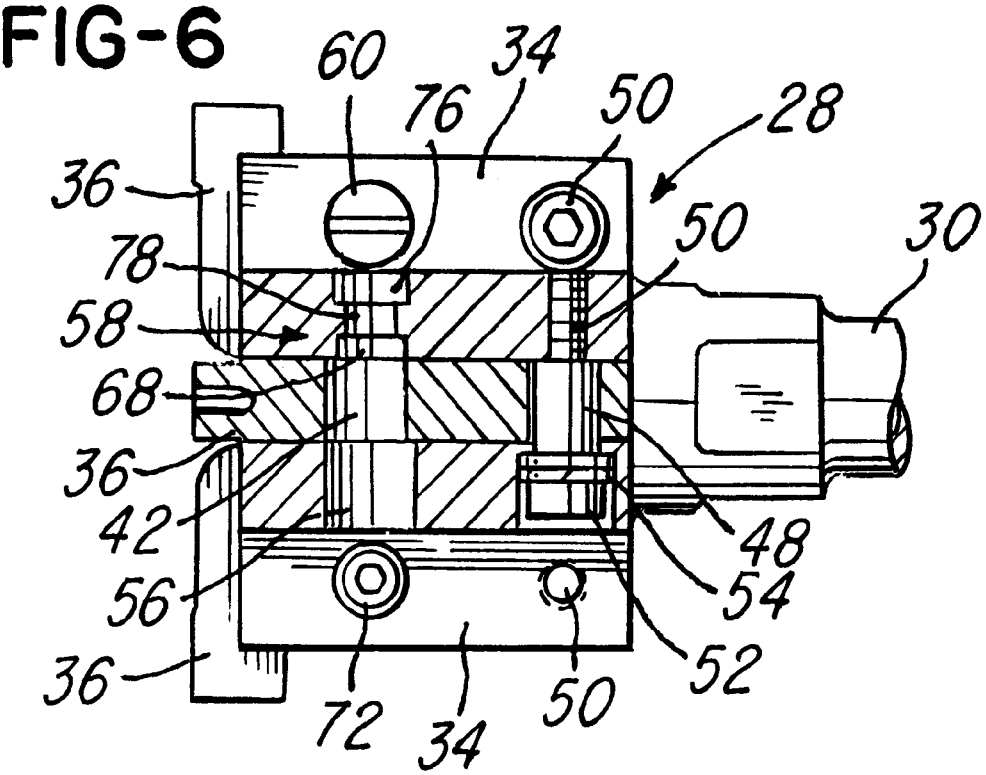

ADJUSTABLE STATOR WINDING HEAD AND METHOD FOR ADJUSTING THE SAME

FIELD OF THE INVENTION

This invention relates to the manufacture of electric motor stators or stators for other dynamoelectric devices and, more particularly, to an adjustable winding head for use in the manufacture of such stators and a method for adjusting such a winding head.

BACKGROUND OF THE INVENTION

Coils of magnet wire are typically wound onto a stator core by way of a winding ram or spindle which is reciprocated through the bore of the stator core along a fixed horizontal axis and oscillated about the horizontal axis adjacent each end of the reciprocal stroke of the winding spindle. Magnet wire is drawn from a source of wire under tension through the winding spindle and through a winding head, which comprises one or more wire-guiding needle tips projecting outwardly from a needle head secured at one end of the winding spindle. As the winding spindle is reciprocated and oscillated, the magnet wire pays out through a wire exit nozzle of each needle tip to form coils of wire around pole pieces on the stator core.

In certain circumstances, a stator manufacturer may desire to wind wires having different diameters onto identically configured stator cores in order to achieve different electrical characteristics from the resulting stator coils. However, in order to wind different sizes of wire onto the stator cores using a single winding machine, it is often necessary to adjust the length of the needle tips, i.e. the distance that the wire exit nozzles thereof are spaced outwardly from the longitudinal axis of the winding spindle, to a proper length for a given wire diameter. Fine wire pays out of a needle tip with a sharp, sometimes ninety degree bend at the wire exit nozzle of the needle tip and thus casts a relatively small arc as it exits the needle, whereas heavy wire pays out of the needle tip at a less severe angle and casts a larger arc. Because it is desirable for the wire exiting the needle tip to follow a path as close as possible to the inner surface of the stator core, a needle tip having a greater length is required for winding fine wire onto a stator in comparison to the needle length required for winding heavier gauge wire onto the same stator core.

The length of a needle tip in a conventional winding head is typically adjusted by removing the needle tip and replacing it with a different needle having an appropriate length, which requires significant down time and attention from an operator. There are known stator winding machines which permit the length of the needle tip to be adjusted, but such machines are intended to be adjusted during coil winding operations in order to obviate the need for coil winding shoes or forms. As a result, adjustment of the needle length is synchronized with the reciprocal and oscillatory motion of the winding spindle, which requires a complex and expensive construction.

SUMMARY OF THE INVENTION

An object of this invention is to provide an adjustable winding head for use in a stator winding machine which can be readily adjusted for use in winding different sizes of wire onto the same stator core configuration. A more particular object of this invention is to provide an adjustable winding head in which the length of the needle tips thereof is readily adjustable without removal of the needle tips. A related object is to provide an adjustable winding head in which the needle tips thereof are fixed at all times during coil winding but can be adjusted when the winding spindle is stationary.

Another object of this invention is to provide such an adjustable winding head which requires only the use of simple tools for adjustment. A related objected is to provide a simple method for adjusting a winding head for use with a particular stator configuration.

Still another object of this invention is to provide an adjustable winding head that can be readily fitted to existing stator winding machines of various known constructions.

A winding head in accordance with this invention comprises a needle head adapted to be secured at one end of a winding spindle of a stator winding machine. At least one needle tip is connected at one end thereof to the needle head by a pivot member and has a wire exit nozzle spaced outwardly away from the longitudinal axis of the needle head. The needle tip is pivotal about the pivot member to adjust the distance that the exit nozzle thereof is spaced away from the longitudinal axis of the needle head.

Further in accordance with this invention, an adjustment member extends through an aperture in the needle head and an aperture in the needle tip, which aperture is spaced from the pivot member. The adjustment member is rotatable about a rotational axis and has a cam portion located within the aperture in the needle tip. The cam portion is eccentric to the rotational axis of the adjustment member so that rotation of the adjustment member about its rotational axis causes the needle tip to be pivoted about the pivot member, thereby adjusting the distance that the exit nozzle thereof is spaced away from the longitudinal axis of the needle head.

Plural adjustable needle tips can be provided in the same manner, preferably at equally-spaced circumferential locations around the longitudinal axis of the needle head.

A desired pivotal position of a needle tip relative to the needle head manner can be set by measuring the current position of the needle and rotating the adjustment member accordingly until the wire exit nozzle of the needle tip is spaced from the longitudinal axis of the needle head by a desired distance. In accordance with this invention, however, adjustment of the needle tips to their desired position is carried out using a gauge, which can comprise a cylindrical rod. The gauge is inserted between the needle tips, and each needle tip is then brought into simultaneous engagement with the gauge, as by rotation of its corresponding adjustment member. Thereafter, the needle tips are fixed in position relative to the needle head. The gauge is dimensioned so that the wire exit nozzle of each needle tip is spaced outwardly away from the longitudinal axis of the needle head by a desired distance when the gauge is located between needle tips and the needles are engaged with the gauge.

The foregoing and other objects and advantages of this invention will become apparent from the following description and accompanying drawings.

BRIEF DESCRIPTION OF THE DRAWINGS

FIG. 1 is a perspective view showing an adjustable winding head in accordance with this invention, a fragment of the winding spindle of a stator winding machine, and a stator core to be wound.

FIG. 2 is an exploded perspective view showing the adjustable winding head and a fragment of a winding spindle shown in FIG. 1.

FIG. 3 is an end elevational view of the winding head.

FIG. 4 is a vertical cross-sectional view of the winding head and the fragment of the winding spindle taken along line 4—4 of FIG. 3.

FIG. 5 is a horizontal cross-sectional view of the winding head taken along line 5—5 of FIG. 3.

FIG. 6 is a fragmentary, cross-sectional view similar to FIG. 5, but with parts removed.

FIG. 7 is an elevational view of an adjustment member forming a part of the winding head.

FIG. 8 is a plan view of the adjustment member as viewed from beneath FIG. 7.

FIG. 9 is a cross-sectional view of the winding head similar to FIG. 4, but also showing a gauge used in accordance with this invention to adjust the winding head.

FIG. 10 is fragmentary perspective view showing a second embodiment of an adjustable winding head in accordance with this invention.

DETAILED DESCRIPTION

FIG. 1 illustrates a winding head, generally designated 20, in accordance with this invention together with a stator core 22 to be wound. The illustrated stator core 22 is of the four-pole variety and has four pole pieces 24 around which coils (not shown) are wound using a conventional stator winding machine. Suitable stator winding machines are shown in U.S. Pat. Nos. 4,158,314 and 4,858,838 and comprise a hollow winding spindle, a fragmentary portion of which is illustrated at 26 in FIG. 1, that is reciprocated and oscillated about a horizontal axis to draw wires W from one or more sources of wire under tension (not shown). As best shown in FIGS. 1, 2, and 4, the winding head 20 comprises a needle head 28 having a hollow shaft 30 that is threadedly connected to the end of the winding spindle 26 coaxially therewith and secured in place by a lock nut 32. As well known, the shaft 30 is provided with a tapered or belled mouth at each end thereof to prevent damage to wires W.

With reference particularly to FIGS. 2 and 3, the needle head 28 also comprises a tip support, generally designated 34, that carries four wire-guiding needle tips 36 at equally-spaced circumferential location about the longitudinal axis of the needle head 28. Because each of the needle tips 36 is mounted to the needle head 28 in the same manner, only one of the needle tips 36 and its mounting to the needle head 28 is discussed further herein.

Referring also to FIG. 4, each needle tip 36 is generally L-shaped and has a wire exit nozzle 38 at the forward end thereof. The needle tip has an arcuate wire-engaging surface 39 that curves inwardly, as shown in FIG. 4, into alignment with the flared opening to the shaft 30 and curves outwardly to the wire exit nozzle 38. Wire W (FIG. 1) from the source of wire under tension (not shown) is drawn through the winding spindle 26, through the shaft 30, over the wire-engaging surface 39, and out through the wire exit nozzle 38 of the needle tip 36. As best seen in FIG. 4, the wire exit nozzle 38 of each needle tip 36 is flared outwardly to prevent scraping or other damage to the wire W as it passes through the nozzle 38. In this respect, the needle tips 36 are also preferably polished and deburred to provide smooth wire-engaging surfaces. In addition, it is also preferable to harden the surface of each needle tip 36, as by known heat treating and chemical coating processes, to thereby provide a longer needle life.

With reference to FIGS. 2 and 4 through 6, each of the needle tips 36 has pair of transverse bores extending therethrough, namely a pivot bore 40 and an adjustment bore 42. The pivot bore 40 is aligned with a cylindrical recess 44 in the tip support 34 of the needle head 28 and also with a tapped bore 46 in the tip support 34 opposite the recess 44. A bushing 48 extends through an opening in the bottom of the recess 44 and into the pivot bore 40 in the needle tip 36. A pivot pin 50 in the form of a machine screw extends through the bushing 48 and into the tapped bore 46, with the head 52 of the pivot pin 50 being received within the recess 44 as shown in FIG. 5. To help secure the pivot pin 50 in place, a conventional lock washer 54 is trapped between the head 52 of the pivot pin 50 and the bushing 48.

As a result of the construction described in the preceding paragraph and for reasons which will become apparent, the needle tip 36 is pivotal about the pivot pin 50 relative to the needle head 28. As evident from FIG. 4, such pivoting of the needle tip 36 permits the wire exit nozzle 38 thereof to be moved closer to or farther from the longitudinal axis of the needle head 28 which, as mentioned above, is coaxial with the longitudinal axis of the winding spindle 26.

The adjustment bore 42 of the needle tip 36 is generally aligned with an aperture 56 in the tip support 34 of the needle head 28 and an opposed aperture 58 therein. A rotatable adjustment member 60, which is shown alone in FIGS. 7 and 8, extends through the aperture 56, through the adjustment bore 42 in the needle tip 36, and into the aperture 58 in the needle head 28. As best shown in FIGS. 7 and 8, the adjustment member 60 comprises a slotted head portion 62, a shaft portion 64 coaxial with the head portion 62, and a central, eccentric cam portion 66. The head portion 62 of the adjustment member 60 is snugly received within the aperture 56 whereas the shaft portion 64 is received within an enlarged portion 68 (FIG. 6) of the aperture 58, as shown in FIG. 5.

With reference to FIGS. 4 and 5, the eccentric cam portion 66 of the adjustment member 60 is rotatably received within the adjustment bore 42. The adjustment member 60 is provided with a tapped bore 70 coaxial with the head portion 62 and the shaft portion 64, and a locking screw 72, which may comprise a machine screw, is threaded into the bore 70 through the aperture 56. The locking screw 72 has a socket head 74 that is partially received within another enlarged portion 76 (FIG. 6) of the aperture 58 that is opposite a reduced diameter portion 78 (FIG. 6) thereof from the enlarged portion 68, and the shaft 80 of the locking screw 72 extends through the reduced diameter portion 78 of the aperture 58.

The adjustment member 60 can be rotated about its rotational axis to change the location of the cam portion 66 thereof relative to the rotational axis. Such change in the location of 45 the cam portion 66 causes the needle tip 36 to pivot about the bushing 48 and the pivot pin 50 to thereby change the distance that the wire exit nozzle 38 of the needle tip 36 is spaced from the longitudinal axis of the needle head 28. Thus, for large diameter wire, the needle tip 36 can be readily adjusted so that its wire-exit nozzle 38 is spaced relatively close to the longitudinal axis of the needle head 28. In contrast, the needle tip 36 can be readily adjusted so that its wire-exit nozzle 38 is spaced relatively far from to the longitudinal axis of the needle head 28 for smaller diameter wire. Once the desired spacing of the wire exit nozzle 38 is achieved, the locking screw 72 is then tightened to rotationally lock the adjustment member 60 in place. When additional adjustment is required, the locking screw 72 is loosened, the adjustment member 60 is rotated as desired, and the locking screw 72 is again tightened.

As apparent, the needle tips 36 are adjustable using only simple tools, such as a screw driver and an allen wrench (not shown) without removal of the needle tips 36 from the needle head 28. Adjustment of the needle tips 36 is made while the winding spindle 26 is stationary. Thus, the needle tips 36 are fixed relative to the longitudinal axis of the needle head 28 and the winding spindle 26 when the spindle is reciprocated and oscillated to wind coils (not shown) onto the stator core 22. Of course, there may be instances where one may desire to automate the needle adjustment process and synchronize the adjustment to the reciprocation and oscillation of the winding spindle 26 to thereby obviate the needle for winding shoes or forms (not shown). Although not so intended, one skilled in the art will recognize that adjustment of the needle tips 36 of a winding head 20 in accordance with this invention may be so automated and synchronized.

With reference to FIGS. 3 and 9, the desired spacing of the wire exit nozzles 38 from the longitudinal axis of the needle head 28 can be achieved by use of a gauge 82 in the form of a cylindrical rod. As shown in FIG. 3, the radially-inwardly facing surfaces 84 of the needle tips 36 are arcuate and generally form a cylindrical surface centered on the longitudinal axis of the needle head 28. The gauge 82 is precisely machined to have a diameter such that, when the gauge 82 is inserted between the needle tips 36 and the needle tips 36 simultaneously engage the gauge 82, the wire exit nozzles 38 of the needle tips 36 are spaced outwardly from the longitudinal axis of the needle head 28 as desired. Thus, to adjust the needle tips 36 as desired, the locking screws are first loosened and, if necessary, the adjustment members 60 are rotated to pivot the needle tips 36 outwardly by a sufficient distance to receive an appropriate gauge 82 therebetween. The end of the gauge 82 is then inserted between the needle tips 36 generally coaxially with the needle head 28. Thereafter, the needle tips 36 are adjusted so that the surface 84 of each needle tip 36 simultaneously engages the outer surface of the gauge 82. At this time, the wire exit nozzles 38 are spaced away from the longitudinal axis of the needle head 28 as desired. The locking screws 72 are then tightened, and the gauge 82 is removed. When a different needle tip spacing is desired, the foregoing steps are repeated with an appropriately-sized gauge 82.

FIG. 10 illustrates a second embodiment of an adjustable winding head, generally designated 100, in accordance with this invention. The winding head 100 may be constructed in substantially the same manner as the winding head 20. Therefore, like reference numbers are applied to like parts in the drawings. Whereas the winding head 20 described above is intended for use in winding four-pole stators and is provided with four needle tips 36, the winding head 100 is intended for use in winding two-pole stators and is provided with only two needle tips 36. Although not shown in the drawings, it will be understood that a winding head in accordance with this invention may also be provided with just a single needle tip or any other desired number of needle tips, depending on how many coils are to be simultaneously wound. Regardless of the number of needle tips 36, a gauge 82 may be used as described above to adjust the length of the needle tip or tips 36. In the case of two opposed needle tips 36, as shown in FIG. 10, the gauge 82 is suitably-shaped to have a width equal to the desired spacing between the needle tips 36, and the gauge is inserted between the needle tips 36. For a winding head having a single needle tip 36, the gauge 82 would be inserted between the needle tip 36 and a fixed portion of the needle head 28.

Although the presently preferred embodiments of this invention have been described, it will be understood that within the purview of the invention various changes may be made within the scope of the following claims.

Having thus described my invention, I claim:

1. For use with a stator winding machine having a winding spindle driven for reciprocatory and oscillatory motion about a longitudinal axis, a winding head comprising:

a needle head having a longitudinal axis, said needle head being adapted to be secured to said winding spindle for reciprocatory and oscillatory movement therewith with the axis of said needle head extending substantially parallel to the axis of said winding spindle;

at least one wire-guiding needle tip movably connected to said needle head, said needle tip having a wire exit nozzle spaced outwardly away from the longitudinal axis of said needle head by an adjustably fixed distance, the spaced distance of said wire exit nozzle from said longitudinal axis being fixed when said winding spindle is driven for reciprocatory and oscillatory motion; and a rotatable adjustment member supported by said needle head having an eccentric cam portion engaged with said needle tip, whereby said adjustment member may be rotated while said winding spindle is stationary to cause said needle tip to move relative to said longitudinal axis of said needle head to thereby adjust said distance.

2. The winding head of claim 1 wherein said adjustment member is disposed within said needle head and has a head portion engageable from outside of said needle head by a simple tool to rotate said adjustment member.

3. The winding head of claim 1 wherein said at least one needle tip comprises a first needle tip, and further comprises a second needle tip movably connected to said needle head diametrically opposite said first needle tip, said second needle tip having a wire exit nozzle positioned outwardly away from said longitudinal axis by a second adjustably fixed distance.

4. The winding head of claim 1 wherein said at least one needle tip comprises plural needle tips movably connected to said needle head at equally-spaced circumferential locations around the longitudinal axis of said needle head, each of said needle tips having a wire exit nozzle spaced outwardly from the longitudinal axis of said needle head by an adjustably fixed distance.

5. For use with a stator winding machine having a winding spindle driven for reciprocatory and oscillatory motion about a longitudinal axis, a winding head comprising:

a needle head having a longitudinal axis, said needle head being adapted to be secured to said winding spindle for reciprocatory and oscillatory movement therewith with the axis of said needle head extending generally parallel to the axis of said winding spindle;

at least one wire-guiding needle tip movably connected to said needle head, said needle tip having a wire exit nozzle spaced outwardly away from the longitudinal axis of said needle head by an adjustably fixed distance; and an adjustment member extending through an aperture in said needle head and a cylindrical aperture in said needle tip, said adjustment member being rotatable about a rotational axis and having a cam portion located within the cylindrical aperture in said needle tip, said cam portion being eccentric relative to the rotational axis said adjustment member, whereby rotation of said adjustment member about its rotational axis causes said needle tip to move relative to said needle head to adjust the distance the wire exit nozzle of said needle tip is spaced from the longitudinal axis of said needle head.

6. The winding head of claim 5 wherein said needle tip is pivotally connected to said needle head by a pivot member spaced from the cylindrical aperture in said needle tip, and wherein rotation of said adjustment member causes said needle tip to pivot relative to said needle head to adjust the distance the wire exit nozzle of said needle tip is spaced from the longitudinal axis of said needle head.

7. The winding head of claim 5 further comprising a second wire-guiding needle tip movably connected to said needle head, said second needle tip having a wire exit nozzle spaced outwardly away from the longitudinal axis of said needle head by an adjustably fixed distance diametrically opposite the wire exit nozzle of said first-mentioned needle tip; and a second adjustment member extending through a second aperture in said needle head and through a cylindrical aperture in said second needle tip, said second adjustment member being rotatable about a rotational axis and having a cam portion located within the cylindrical aperture in said second needle tip, said cam portion of said second adjustment member being eccentric relative to the rotational axis of said second adjustment member, whereby rotation of said second adjustment member about its rotational axis causes said second needle tip to move relative to said needle head to adjust the distance the distance that the wire exit nozzle of said second needle tip is spaced from the longitudinal axis of said needle head.

8. The winding head of claim 7 wherein said first-mentioned needle tip and said second needle tip form a first pair of diametrically-opposed needle tips, and wherein said winding head further comprises a second pair of diametrically-opposed needle tips connected to said needle head in the same adjustable manner as said first pair of diametrically-opposed needle tips.

9. The winding head of claim 8 wherein said first pair of needle tips are opposed along a first axis and wherein said second pair of needle tips are opposed along a second axis perpendicular to said first axis.

10. The winding head of claim 5 wherein said at least one needle tip comprises plural needle tips movably connected to said needle head at equally-spaced circumferential locations around the longitudinal axis of said needle head, each of said needle tips having a wire exit nozzle spaced outwardly from the longitudinal axis of said needle head by an adjustably fixed distance, the spaced distance of the wire exit nozzle of each needle tip being adjusted by rotation of its corresponding adjustment member.

11. The winding head of claim 5 wherein said adjustment member has a head portion engageable from outside of said needle head by a simple tool to rotate said adjustment member.

12. A method for adjusting a stator winding head comprising a needle head having a longitudinal axis and at least one needle tip movably connected to said needle head for movement relative to said longitudinal axis, said needle tip having a wire exit nozzle spaced outwardly away from the longitudinal axis of said needle head, said method comprising:

(a) inserting a gauge between said at least one needle tip and an opposed portion of said winding head;

(b) causing said gauge to be engaged with said opposed portion of said winding head and said needle tip at the same time, said gauge being dimensioned so that the wire exit nozzle of said needle tip is positioned outwardly away from the longitudinal axis of said needle head by a desired distance when said gauge is engaged with said opposed portion of said winding head and said needle tip is, at the same time, engaged with said gauge;

(c) while said needle tip is engaged with said gauge, fixing said needle tips in position relative to said needle head; and (d) removing said gauge from between said needle tip and said opposed portion of said winding head.

13. The method of claim 12 wherein said opposed portion of said winding head is diametrically opposed from said needle tip.

14. The method of claim 12 wherein said opposed portion of said winding head comprises a second needle tip movably connected to said needle head.

15. The method of claim 12 wherein said winding head comprises plural needle tips located at equally-spaced circumferential locations around the longitudinal axis of said winding head, and wherein said step (a) comprises inserting said gauge between said plural needle tips, and wherein said step (b) comprises causing said gauge to be engaged with each of said plural needle tips at the same time.

16. The method of claim 12 wherein said gauge comprises a cylindrical rod.

* * * * *